United States Statutory Invention Registration [19]

[11] Reg. Number: H478

Blytas [43] Published: Jun. 7, 1988

[54] SELECTIVE REDUCTION OF SODIUM IN COAL BY WATER WASH AND ION EXCHANGE WITH TAILORED ELECTROLYTE

[75] Inventor: George C. Blytas, Houston, Tex.

[73] Assignee: Shell Oil Company, Houston, Tex.

[21] Appl. No.: 779,716

[22] Filed: Sep. 24, 1985

[51] Int. Cl.[4] ..... C10L 9/02

[52] U.S. Cl. ..... 44/621; 208/403; 208/428; 423/461; 210/681; 209/4

[58] Field of Search ..... 44/1 R, 1 SR; 201/17; 423/461

[56] References Cited

U.S. PATENT DOCUMENTS

| | | | |
|---|---|---|---|
| 3,454,363 | 7/1969 | Rieve | 201/17 |
| 4,127,390 | 11/1978 | Dondelewski | 44/1 SR |
| 4,268,271 | 5/1981 | Curtin | 44/1 SR |
| 4,516,980 | 5/1985 | Wheelock | 44/1 SR |

OTHER PUBLICATIONS

Removal of Sodium from Illinois Coal by Water Extraction, Neavel et al, Chemical Abstracts, vol. 88:25374e, 1978.

Reduction of Sodium in Lignite by Ion Exchange: A Pilot Plant Study, Paulson et al, Chemical Abstracts, vol. 93:134825b, 1980.

Removal of Sodium from Lignite by Ion Exchange with Calcium Chloride Solutions, Paulson et al, Chemical Abstracts, vol. 95:189825y, 1981.

Beneficiation of Lignite by Sodium Removal Using Ion Exchange, Baria et al, Chemical Abstracts, vol. 98:3740h, 1983.

Reduction in Ash Fouling Potential of Lignite by Ion Exchange, Baria et al, Chemical Abstracts, vol. 98:128905q, 1983.

Ion Exchange in Selected Low Rank Coals. Part II: Kinetics, Bobman et al., Chemical Abstracts, vol. 100:54204w, 1984.

*Primary Examiner*—John F. Terapane
*Assistant Examiner*—Susan Wolffe

[57] ABSTRACT

A coal or similar carbonaceous fuel is selectively freed of sodium by water washing it and ion exchanging the washed coal with a strong aqueous electrolyte solution which is substantially free of sodium ions and contains a kind and concentration of ions which are correlated with the composition of the coal to cause a selective removal of ion-exchangeable sodium from the coal.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SELECTIVE REDUCTION OF SODIUM IN COAL BY WATER WASH AND ION EXCHANGE WITH TAILORED ELECTROLYTE

RELATED APPLICATIONS

The present application is related to my commonly assigned and concurrently filed applications Ser. Nos. 779,718 (now abandoned) and 779,717 on "Reduction of Sodium in Coal by Water Wash and Ion Exchange with Weak Electrolyte" and "Reduction of Sodium in Coal by Water Wash Followed by Ion Exchange Within A Pipelne." The disclosures of the related applications are incorporated herein by reference.

BACKGROUND OF THE INVENTION

The present invention relates to upgrading coal by removing sodium ions. More particularly, the invention relates to removing sodium ions from coal by means of water-washing and ion-exchanging.

The presence of large amounts of sodium in coal is undesirable as it contributes to fouling of combustion facilities. The fouling problems can arise if sodium exceeds about 3% w (as $Na_2O$), yet several important deposits of coal contain considerably more than that much sodium. Thus, a process which can economically remove, for example, 30 to 70 percent of the sodium, can be very desirable and can be a prerequisite condition for exploitation of sizeable deposits.

The levels of sodium oxide in the ash at which coal combustion can lead to fouling problems are not yet clearly defined, and can be different for different coals. Nevertheless, levels in excess of about 3% w are not desirable and coals with more than 4% w in the ash, are generally difficult to market. Some Powder River Basin coal samples have been found to yield over 6% w of sodium oxide. And, coals with sodium oxide contents in excess of 8 or 9% w have also been found and documented.

U.S. Department of Energy publication DOE/GFETY/RI-82/3 "Conceptual Design of a 1.6 MM Tons/Year Lignite Preparation Facility for Sodim Reduction" describes ion exchanges of coal with 0.11 normal sulfuric acid for various times and solid to liquid ratios and indicates that a sodium oxide content decreased from 8.5 to 0.99% and the selectivity of the ion removal varied with variations in residence time.

A publication from Pennsylvania State University Fuel Science Program "Ion Exchange in Selected Low Rank Coals, Part I Equilibrium, Part II Kinetics," Solvent Extraction, Ion Exchange, 1:4, 813–825 (1983), describes measurements of equilibrium ion exchange behavior for metal cations with hydrogen ions and indicates the exchange to be a linear function of pH regardless of the cation concentration of the solution; with the extent of exchange being a function of available hydrogen ions.

SUMMARY OF THE INVENTION

The present invention releates to an improved ion exchange process for reducing the sodium content of coal. The coal is first washed with water that is substantially free of sodium ions, to remove water-soluble materials containing those ions. The washed coal is then ion exchanged with an aqueous solution of strong electrolyte solution in which both the kinds and concentrations of ions are correlated with the kind and concentration of ion exchangeable cations on the coal. The electrolyte solution used in the ion exchange (a) is relatively free of sodium ions, (b) is sufficiently free of substances capable of forming atmospheric pollutants during the oxidation of coal so that the resultant total amount of those substances in the ion exchanged coal is insufficient to cause significant pollution, and (c) contains cations capable of exchanging with ion exchangeable cations on the coal in an amount which is less that the stoichiometric amount of the cations on the coal but is an amount which causes sodium ions to be removed selectively from the coal. The amount of the cations capable of exchanging with cations on the coal is preferably about 20 to 80% less than the stoichiometric amount of the cations on the coal.

The advantages of this invention are many fold. Some of these advantages are: (a) the consumption of exchanging reagent can be kept at an economically acceptable low level; (b) the process is selective in removing sodium rather than calcium and magnesium, which are often useful as sulfur oxide capturing species; (c) the spent solutions do not leave a very low pH, and thus are relatively non-corrosive and easy to dispose of; and (d) the process can be adapted or tailored to suit a wide variety of coals, by determining their cationic concentration and adjusting the concentration of the ion exchanging solution as described herein.

DESCRIPTION OF THE INVENTION

We have found that sodium may occur in coals in three forms; (a) water-soluble sodium, (b) ion-exchangeable sodium, and (c) fixed sodium. The ion-exchangeable sodium can be about 30 to 80 percent of the total, with the balance split between water-soluble and fixed sodium. Many low-rank coals can be rendered marketable and usable by the present process, which is often capable of removing 30 to 70 percent of the sodium ions (measured as $Na_2O$) economically. This invention is illustrated by using a coal sample from the Powder River Basin. However, the invention is not limited to coals of this origin, and the method disclosed herein is readily adaptable to essentially any coal or lignite characterized by a high sodium level.

A sample of coal from the Powder River Basin was ground into three fractions as follows:

(A) ¾" by 28 mesh (B) Less than 14 mesh (C) Less than 28 mesh

Sample fractions (B) and (C) were dried to 8–9% w water (down from about 25%) by heating in a vacuum at 100° C. Analysis of sample fractions (B) and (C) has yielded $Na^+$ $Mg^{++}$ and $Ca^{++}$ contents and ash levels which were less than 3% apart. Accordingly, for the metal removal calculations, we have used the average of analyses obtained on sample fractions (B) and (C).

We can consider the coal sample as an ion-exchanger in which negative fixed sites (believed to be R—$COO^-$ or similar moieties) are counterbalanced by ion-exchangeable cations, primarily by $Na^+$, $Ca^{++}$ and $Mg^{++}$ ions. Relatively minor amounts of $K^+$ ion and other metal ions are also present, but will be neglected in the present context. The form in which iron occurs has not been determined, although it is expected to be primarily as pyrite. In Table 1, along with the analysis of $Na^+$, $Ca^{++}$ and $Mg^{++}$, we show the percentage of base capacity contributed by each of these cations.

TABLE 1

Metal and Ash Contents of the Coal Tested

| | Fraction 14–28 Mesh | Fraction <28 Mesh | Average | Equivalent Base Capacity % |
|---|---|---|---|---|
| Sodium (ppm) | 2370 | 2430 | 2400 | 17 |
| Calcium (ppm) | 7570 | 7800 | 7685 | 64 |
| Magnesium (ppm) | 1330 | 13700 | 1350 | 19 |
| Ash % w | 4.79 | 4.77 | 4.78 | — |

Contact times from a few hours to several days were studied, the former corresponding to mine-mouth conditions, the latter corresponding to pipeline transport conditions. Coal particle sizes and solid/liquid ratios were selected accordingly.

The degree of sodium, calcium and magnesium reduction in coal, resulting from various ion-exchange treatments, was estimated by monitoring the increase in the level of these ions in the treating solution. In general, $Na^+$ analysis was done by ion-specific electrode methods, whereas $Ca^{++}$ and $Mg^{++}$ analysis was done by titration methods.

Sodium reduction by exchange with strong electrolytes was studied using sulfuric acid, $H_2SO_4$, and calcium chloride, $CaCl_2$. Three levels of stoichiometry were investigated, in three sets of experiments, as follows:

Set 1: Using 200% of the stoichiometric amount of ion-exchangeable cations on the coal, i.e., using twice as many equivalents of $H^+$, or $Ca^{++}$ as the total $Na^+ + Ca^{++} + Mg^{++}$ equivalents in the coal.

Set 2: Using 68% of the stoichiometric amount, which is less than the total equivalent present in the coal but more than the most abundant cation, calcium, which accounts for 64% of the coal capacity, and Set 3: Using, 23% of the stoichiometric amount, which is still 35% more than the equivalent of sodium present in the coal.

The removal of $Na^+$ or other ions achieved in these three Sets was compared with the extent of removal achieved by water washing. This latter figure yields the amount of sodium associated with water-soluble salts adhering to the coal as crystalline salts or dissolved salts.

Tables 2 and 3 summarize the results obtained in experimental Set-1, at 20% of stoichiometric addition of the exchange agent. The Tables also show the effect of washing with water only. It should be noted that the equilibrium pH with the $H_2SO_4$ experiments (i.e., ion-exchanges with an aqueous solution containing a 100% excess of cations capable of exchanging with ion-exchangeable cations on the coal) was less than 1, whereas the water and $CaCl_2$ treatments yielded solutions of nearly neutral pH. All of these tests were carried out using 3/1 liquid/solid ratios. The large excess of reagents in these tests make them useful as "reference tests," but too high for consideration in practical sodium reduction process.

Table 2 shows that 78 to 81% of the $Na^+$ is removed with excess $H_2SO_4$ reagent in two days. Since water wash alone brings about 20±1% reduction, we can conclude that the maximum exhangeable $Na^+$ ion is Ca. 60% of the total. From the data in Table 2, we also conclude that about 19% of the sodium is associated with species which are insoluble even in excess 0.2 N $H_2SO_4$ solution.

In experimental Set-1 (200% Stoichiometric) $CaCl_2$ was marginally less efficient than $H_2SO_4$ in sodium reduction. It is not clear whether this is a real difference in reagent effectiveness, or a reflection of the difficulty associated with $Na^+$ determinations in the presence of a large excess of $Ca^{++}$ ions.

In set-1 experiments, water wash yielded essentially no $Ca^{++}$ or $Mg^{++}$ ion leaching. Thus, those species either are not present as water soluble salts in the aqueous phase adhering on the ground-up, partially dried coal samples or, if they are present as soluble salts, there is a high affinity for absorption of such salts on the coal.

Table 3 shows the extraction of $Ca^{++}$ ions by $H_2SO_4$. An interesting observation is noted for samples B and C in this Table, i.e., with the samples which had been ground-up. In these samples, the calcium ion concentration goes through a maximum in 1 to 2 hours. This trend must be due to changes in solubility and adsorptivity of $CaSO_4$ species. Apparently, the solubility of $CaSO_4$ decreases with decreasing acidity of the solution, i.e., decreases as the exchange of base metal by $H^+$ proceeds to completion after the first 2 or so hours. The coarser sample did not show this effect.

TABLE 2

Sodium Reduction (%) by Treatment with 100% Excess $H_2SO_4$ and $CaCl_2$ and With Water

| Contact Time (hours) | Sample: (A) ¾" by 28 Mesh, Solution I | (A) II | (A) III | (B) −14 Mesh, Solution I | (B) II | (B) III | (C) −28 Mesh, Solution I | (C) II | (C) III |
|---|---|---|---|---|---|---|---|---|---|
| 0.8 | 48 | 25 | 16 | 73 | 60 | 16 | 78 | 59 | 18 |
| 2.4 | 53 | 33 | 18 | 75 | 60 | 17 | 80 | 60 | 18 |
| 24 | 61 | 65 | 19 | — | — | 19 | 81 | — | 19 |
| 48 | 77 | 66 | 21 | 78 | 66 | 21 | 81 | 66 | 22 |

Conditions
Liquid to Solid Ratio: 3 to 1
Solutions:
I = 0.4 N $H_2SO_4$
II = 0.4 N $CaCl_2$
III = Deionized water
$Na^+$ analysis in ppmw
Ambient temperature with shaking

TABLE 3

Calcium Reduction (%) by Treatment With 100% Excess of $H_2SO_4$

| Contact time (hrs) | Sample: (A) ¾" by 28 Mesh, % Reduction | (B) −14 Mesh | (C) −28 Mesh |
|---|---|---|---|
| 0.2 | 3 | 38 | 37 |
| 0.8 | 17 | 50 | 50 |
| 2.4 | 18 | 46 | 40 |
| 24 | 22 | 24 | 23 |
| 48 | 23 | 24 | 23 |

Conditions:
Liquid to Solid Ratio: 3 to 1
Solution: 0.4 N $H_2SO_4$
Shaking at 23° C.

In experimental Set-2 (with 68% of the stoichiometric amount of reagent), the amount of cations is still 4-times the amount needed to exchange all of the $Na^+$ ion present at high selectivity. In this set, only −14 mesh coal was used, and long contact times were studied to simulate pipeline transport conditions more closely.

The results from experimental Set-2 are shown in Tables 4 and 5. The $Na^+$ reductions achieved with this dosage compares favorably with those achieved with the four times higher reagent dosages in Set-1 (200%). From a process standpoint, an additional advantage over Set-1 is that the pH levels at equilibration are higher in Set-2 than in Set-1. Thus, the final pH region with $H_2SO_4$ exchanges shown in Table 2 is ca. 0.8 after 48 hours, whereas the pH obtained with $H_2SO_4$ exchange in Table 4, is 2.9 after 10 minutes, 4.1 after 45 minutes, and 5.3 after 2.4 hours. This last high pH value also suggests that the normality of the treating solution was reduced from 0.1N initially to ca. 0.00001N, thus indicating that essentially all of the $H^+$ ion available was consumed to exchange cations from coal.

With regard to sodium reduction, Set-2 results agree closely with those of Set-1 (compare to Tables 2 and 4). A notable difference is that 0.1N $CaCl_2$ appears to be a more effective exchanger than 0.4N $CaCl_2$. It is, however, also possible that the $Na^+$ analysis in Set-2 is more accurate, because the $Ca^{++}$ level at the end of exchange was very low (unlike in Set-1).

With regard to the exchange of $Ca^{++}$ and $Mg^{++}$, Table 5 shows again a maximum of exchange in the first 2 to 3 hours, with a subsequent gradual reduction over the next 2 to 3 days. This trend has been observed with other samples as well and appears to be a characteristic of $Ca^{++}$ and $Mg^{++}$ exchange by $H_2SO_4$. This type of behavior should be considered when selecting conditions for an optimal ion exchange of coal.

Table 6 shows further how the level of $Na^+$ ion in solution increases with time, whereas the levels of $Ca^{++}$ and $Mg^{++}$ in solution decrease with time. The percentage of $Na^+ + Mg^{++} + Ca^{++}$ which migrate from the coal into the solution decrease from 50% of the total coal base in 0.8 hours to 40% in 92 hours. In Table 6, the sodium present in solution is 82% of the total, about the same as reflected in Table 4.

TABLE 4

| $Na^+$ Exchange with 68% of Stoichiometric $H_2SO_4$ and $CaCl_2$ Solutions and Water | | | |
|---|---|---|---|
| | Solution: | | |
| | 0.1 N $H_2SO_4$ | 0.1 N $CaCl_2$ | $H_2O$ |
| Contact Time (Hrs) | Percent $Na^+$ Exchanged and/or Washed | | |
| 0.2 | 63 | 51 | 18 |
| 0.8 | 76 | 76 | 19 |
| 2.4 | 76 | 77 | 18 |
| 24 | 80 | 80 | 20 |
| 48 | 80 | 80 | 22 |
| 92 | 81 | 81 | 23 |

Liquid to Solid Ratio: 3 to 1
Particle Size less than 14 mesh

TABLE 5

| $Ca^{++}$ and $Mg^{++}$ Exchange Using 68% of Stoichiometric $H_2SO_4$ Solution | | |
|---|---|---|
| Contact Time (Hours) | $Ca^{++}$ Exchange % | $Mg^{++}$ Exchange % |
| 0.2 | 36 | 94 |
| 0.8 | 46 | 96 |
| 2.4 | 47 | ~100 |
| 24 | 26 | 91 |
| 48 | 25 | 83 |
| 92 | 24 | 57 |

Liquid to Solid Ratio: 3 to 1
0.1 N $H_2SO_4$ Solution
Particle Size <14 Mesh.

TABLE 6

| Percentage of Coal Base Found in Solution after 0.8 and 92 hours | | | | |
|---|---|---|---|---|
| Time (Hours) | Sodium | Calcium | Magnesium | Total |
| 0.8 | 13 | 29 | 17 | 59 |
| 92 | 14 | 15 | 11 | 40 |

TABLE 6-continued

| Percentage of Coal Base Found in Solution after 0.8 and 92 hours | | | | |
|---|---|---|---|---|
| Time (Hours) | Sodium | Calcium | Magnesium | Total |
| Maximum | 17 | 64 | 19 | 100 |

The results obtained in Experimental Set-3 (with 23% of the stoichiometric amounts) are summarized in Tables 7 and 8. These experiments were performed at a 3 to 1 liquid to solid ration with 0.03N $H_2SO_4$ or $CaCl_2$. These dosages correspond to a 35% excess over the sodium level present.

TABLE 7

| $Na^+$ and $Ca^+$ Exchange with $H_2SO_4$ at 23% of Stoichiometric Ratio | | |
|---|---|---|
| Contact Time (hours) | $Na^+$ Exchange % | $Ca^{++}$ Exchange % |
| 0.2 | 56 | 12 |
| 0.8 | 60 | 12 |
| 2.4 | 62 | 11 |
| 24 | 65 | 11 |
| 48 | 68 | 11 |

Liquid to Solid Ratio: 3 to 1
0.03 N $H_2SO_4$ Solution

TABLE 8

| Displacement of $Na^+$ by 23% of Stoichiometric $CaCl_2$ Solution | |
|---|---|
| Contact Time (hours) | Percent Exchanged |
| 0.2 | 54 |
| 0.8 | 59 |
| 2.4 | 60 |
| 48 | 65 |

Liquid to Solid Ratio: 3 to 1

Tables 7 and 8 show that $Na^+$ is displaced more completely than $Ca^{++}$ by $H_2SO_4$. However, both, $H_2SO_4$ and $CaCl_2$ can displace over 60% of the $Na^+$ in 2.4 hours (Table 8).

In Table 7, the displacement of $Na^+$ corresponds to 12% of the total available base, whereas that of $Ca^{++}$ corresponds to 8%. We can define a selectivity for $Na^+$ versus $Ca^{++} + Mg^{++}$ removal by comparing the relative amounts of $Na^+$ removed to those of $Ca^{++} + Mg^{++}$. Such a definition would suggest that the lower concentrations of $H_2SO_4$ are more effectively utilized in Na-reduction than the higher concentrations of $H_2SO_4$.

Quantitatively, we can define the selectivity ($\beta$) for $Na^+$ over $Ca^{++} + Mg^{++}$ as follows:

$$\beta = \frac{\dfrac{\text{\% of total base capacity } (TBC) \text{ extracted as } Na^+}{\text{\% of } TBC \text{ accounted by } Na^+ \text{ in coal}}}{\dfrac{\text{\% of } TBC \text{ extracted as } Ca^{++} + Mg^{++}}{\text{\% of } TBC \text{ accounted by } Ca^{++} + Mg^{++} \text{ in coal}}}$$

In Table 9, this ratio, $\beta$, is given for the three sets of experiments, using the longest contact time results in each one. The selectivity goes from 1.94 at 200% stoichiometric, through 2.54 at 68% stoichiometric, to 8 at 23% stoichiometric. The corresponding reductions of sodium achieved are 80%, 80% and 68%. These results show clearly that we can achieve a significant degree of sodim reduction, using only moderate amounts of ion exchange reagent. The concept of selective use of a reagent for sodium reduction can be used to arrive at near optimal process conditions, either for mine-mouth or for coal slurry pipeline application.

TABLE 9

| Selectivity of $H_2SO_4$ for $Na^+$ versus $Ca^{++} + Mg^+$ Removal | | |
|---|---|---|
| $H_2SO_4$ Excess over Stoichiometric[a] | $\beta$ | % $Na^+$ Reduction |
| 200% | 1.94 | 80 |
| 68% | 2.54 | 80 |
| 23% | 8.0% | 68 |

[a]Estimated on the basis of Total Base Capacity (TBC) of $Na^+ + Ca^{++} + Mg^{++}$ In order to assess the effect of background $Na^+$ ions on the washing and ion exchange capacity of water and $H_2SO_4$ solutions we have added background concentrations of 0.04% w $Na_2SO_4$ (130 ppm $Na^+$) and 0.1% w $Na_2SO_4$ (320 ppm $Na^+$) in deionized water or in 0.01N $H_2SO_4$ reagents and studied $Na^+$ reduction in 1 and 2 hours. The results shown in Table 10, show that at low reagent concentrations (justified by the high liquid/solid ratios), the $Na^+$ would have an adverse effect on $Na^+$ reduction in a mine-mouth operation (short contact times, high liquid/solid ratios).

The results shown in Table 10 were obtained at a relatively high $Na^+$ level (130 and 320 ppm) and with low $H_2SO_4$ normality. A second experiment was carried out in which both $Na^+$ and $Ca^{++}$ were added as background cations at 100 ppm each and the concentration of $H_2SO_4$ was raised to 0.025N and to 0.05N. A liquid to solid ration of 6 was used. The results, summarized in Table 11, show that sodium reduction in this case is in the range of 60 to 70% in three hours, i.e. acceptable for most process applications.

TABLE 10

| Effect of $Na^+$ Level in Solution on $Na^+$ Reduction | | |
|---|---|---|
| | % $Na^+$ Removal | |
| Aqueous Phase | 1 HR | 2 HRS |
| Deionized Water | 23 | 25 |
| Deionized Water + 0.04% w $Na_2SO_4$ | 19 | 23 |
| Deionized Water + 0.1% w $Na_2SO_4$ | <10 | 12 |
| 0.01 N $H_2SO_4$ | 50 | 59 |
| 0.01 N $H_2SO_4$ + 0.04% w $Na_2SO_4$ (0.0056 N $Na_2SO_4$) | 39 | 56 |
| 0.01 N $H_2SO_4$ + 0.1% w $Na_2SO_4$ (0.014 N $Na_2SO_4$) | 20 | 32 |

Liquid to solid ratio: 6 to 1

All values are ±14% of the reported removal, due to analytical difficulties resulting from the use of high levels of $Na^+$ background in the sample.

TABLE 11

| Sodium Reduction Using $H_2SO_4$ in the Presence of Sodium and Calcium Ions Background cations in reagent solutions: 100 ppm $Na^+$, 100 ppm $Ca^{++}$ | | | | |
|---|---|---|---|---|
| | Solution: | | | |
| | 0.025 N | | 0.05 N | |
| Contact Time (Hrs) | % $Na^+$ Removal | % $Ca^{++}$ Removal | % $Na^+$ Removal | % $Ca^{++}$ Removal |
| 1 | 49 | 16 | 60 | 31 |
| 2 | 59 | 14 | 66 | 35 |
| 3 | 61 | 14 | 71 | 37 |

Liquid to solid ratio: 6 to 1
Reduction results are ± 8% of the reported value.

Comparison of the results in Tables 10 and 11 suggests that the ionic composition of the water used to make the exchange solution should be considered in some process applications. However, at high ratios $(H^+ + Ca^{++})/(Na^+)$ the effect of background sodium on sodium displacement becomes less critical.

In general the present invention can advantageously be applied to substantially any type of coal and/or lignite, or other solid carbonaceous fuel having an undesirably high sodium content such as 4% or more sodium oxide in the ash. Such materials are referred to herein by the term "coal".

The aqueous solution of strong electrolytes with which the coal is ion exchanged can be compounded in substantially any manner as long as the resulting solution contains a kind and amount of ions which are correlated as specified with the composition of coal being treated. As known to those skilled in the art, particularly suitable cations for use in such exchanges comprise hydrogen, calcium, and magnesium ions. Particularly suitable anions for such use comprise sulfate and, whenever the chlorine concentration in non-water soluble components of the coal is suitably low, chloride ions. Nitorgen-containing substances such as ammonia ions or nitrate or other nitrogen-containing anions are typical of substances capable of forming atmospheric pollutants during oxidation of the coal and should be avoided.

An ion exchanging of coal in an aqueous electrolyte solution generally leaves the coal wetted with an aqueous solution of salts which tend to become deposited on or otherwise attached to the coal as the water evaporates, unless the ion-exchanged coal receives an additional washing with substantially deionized water. Where the coal contains a relatively low concentration such as less than about 0.3% w of chlorine in non-water-soluble components, an aqueous electrolyte comprising calcium chloride or mixtures of it with acids which form water-soluble calcium salts are particularly suitable electrolyte solutions for uses in situations where the pH of the coal ion exchanging solution must be kept relatively non-acidic. Since most coals contain less than 0.3% w chlorine it follows that $CaCl_2$ and its mixtures can be useful exchanging agents in numerous applications.

In a preferred procedure coal ground to particles of less than about ¾" diameter is water-washed by a process involving immersing the coal in an aqueous liquid which is substantially free of sodium ions. The washed coal is mechanically separated from the liquid in at least two fractions. Fraction (A) comprises relatively large coal particles capable of being settled by gravity from the liquid in a feasibly short time. Fraction (B) comprises the particles which are too fine for such a desirably rapid mechanical separation. The particles of fraction (A) are separately ion-exchanged with an aqueous electrolyte, then mixed with an aqueous slurry of the particles of fraction (B). The resulting mixture is preferably subjected to an additional ion-exchange.

What is claimed is:

1. In a process for reducing the sodium concentration of coal by contacting the coal with an aqueous solution of strong electrolyte, an improvement comprising:

initially washing the coal with water which is substantially free of sodium ions, to remove water-soluble materials which contain sodium ions; and ion-exchanging the water-washed coal with an aqueous solution of strong electrolyte in which both the kinds and amounts of ions are correlated with the kings and amounts of ion-exchangeable ions on the coal, so that said solution (a) is relatively free of sodium ions, (b) is sufficiently free of substances capable of forming atmospheric pollutants during an oxidation of coal so that the resultant total amount of those substances in the ion-exchanged coal is insufficient to cause significant pollution and (c) contains an amount of cations capable of exchanging with ion-exchangeable cations on the coal which amount is about 20 to 80% less than the stoichiometric amount of ion-exchangeable cations on the coal and is an amount which causes sodium ions to be selectively removed during the ion exchanging of the coal.

2. The process of claim 1 in which said aqueous solution of electrolyte consists essentially of an aqueous solution of sulfuric acid.

3. The process of claim 1 in which the sulfuric acid concentration is from about 0.01 to 0.2 normal.

4. The process of claim 1 in which the chlorine concentration in the coal is less than about 0.3% w and the aqueous solution of electrolyte consists essentially of an aqueous solution of calcium chloride.

5. The process of claim 4 in which the electrolyte concentration is about 0.01 to 0.4 normal.

6. The process of claim 1 in which the coal contains 2.5 to 10% w sodium as sodium oxide.

* * * * *